(12) United States Patent
Heckmann et al.

(10) Patent No.: US 6,430,478 B2
(45) Date of Patent: Aug. 6, 2002

(54) SYSTEM FOR CONTROLLING/ REGULATING THE OPERATIONAL SEQUENCES IN A MOTOR VEHICLE AND A METHOD FOR STARTING SUCH A SYSTEM

(75) Inventors: Hans Heckmann, Karlsruhe; Reinhard Weiberle, Vaihingen/enz; Bernd Kesch, Hemmingen, all of (DE)

(73) Assignee: Robert Bosch GmbH, Stuttgart (DE)

( * ) Notice: Subject to any disclaimer, the term of this patent is extended or adjusted under 35 U.S.C. 154(b) by 0 days.

(21) Appl. No.: 09/871,228

(22) Filed: May 31, 2001

(30) Foreign Application Priority Data

May 31, 2000 (DE) .......................................... 100 27 006

(51) Int. Cl.$^7$ ................................................. G06F 7/70
(52) U.S. Cl. .............................. 701/1; 701/36; 701/70
(58) Field of Search ................................. 701/1, 29, 36, 701/70, 71, 78, 82, 83; 340/825.52; 303/7, 16, 17

(56) References Cited

U.S. PATENT DOCUMENTS

| | | | | |
|---|---|---|---|---|
| 5,717,387 A | * | 2/1998 | Suman et al. | 340/825.31 |
| 5,895,433 A | * | 4/1999 | Chen et al. | 701/71 |
| 5,897,600 A | * | 4/1999 | Elmore et al. | 701/36 |
| 6,139,118 A | * | 10/2000 | Hurst et al. | 303/7 |
| 6,219,601 B1 | * | 4/2001 | Shono et al. | 701/36 |
| 6,230,089 B1 | * | 5/2001 | Lonn et al. | 701/36 |

\* cited by examiner

*Primary Examiner*—Richard M. Camby
(74) *Attorney, Agent, or Firm*—Kenyon & Kenyon

(57) ABSTRACT

The system includes a central memory, in which all programs necessary for controlling/regulating the operational sequences of a vehicle are stored. At the start of the system, the control units load the needed programs into their working memory via indirect memory access. The method provides that, after the system is switched on, the units first identify themselves. After that, by means of the loading programs, the programs are loaded from the central memory into the working memory of each control unit via indirect memory access.

7 Claims, 4 Drawing Sheets

SYSTEM FOR CONTROLLING/ REGULATING THE OPERATIONAL SEQUENCES IN A MOTOR VEHICLE AND A METHOD FOR STARTING SUCH A SYSTEM

BACKGROUND INFORMATION

A plurality of control devices for controlling or regulating the operational sequences in a motor vehicle are provided. These control devices, of which each controls or regulates a functional unit of the motor vehicle during operation, are connected to one another via a communications system.

In principle, the control devices can be subdivided into two categories. For one thing, there are the so-called individual control devices. These are control devices having an individual program and hardware, which are used, for example, for regulating the ABS system and the engine management system. For another thing, so-called control devices of similar construction are provided, such as control devices for regulating the elctromechanical brake (EMB). In the case of the EMB, four control units are provided—one per wheel—which are identically constructed and operated with the same software. The four control devices fulfill the same function, namely, adjusting the braking force according to a setpoint input.

When each individual wheel is regulated, the differences come about only from the specific positioning of the control unit. That is the case in a braking force distribution between front and rear axle, and in operating an ABS, ASR or ESP. In those cases, the control device has to know which wheel is to be regulated, since wheel-specific setpoint values are to be adjusted.

The control devices usually have a non-volatile program memory and a volatile memory. Programming is done once, and remains unchanged for the service life of the equipment. For a change in programming, the non-volatile memories of all the control devices have to be reprogrammed. Therefore, a later modification of the functional units of a motor vehicle prove to be extremely costly.

It is, therefore, an object of the present invention to provide a system for controlling or regulating the operational sequences of a motor vehicle, by which subsequent modifications are easily carried out. It is a further object to provide a method by which starting or initializing such a system can be carried out.

SUMMARY OF THE INVENTION

In the system of the present invention, the non-volatile memories in the control devices contain a loading routine. A main control device having a central memory, in which the programs of all the control devices for controlling/regulating are stored, is provided which makes possible indirect access to the control devices. The connecting elements make possible an identification of the respective control device.

Thus, the program for controlling the control devices are no longer in the non-volatile memories of each control unit, as it is known from the related art. Instead, they are stored in a central place in the central memory. This quite considerably simplifies subsequent modifications, e.g. with recall actions, since now the program changes have to be carried out at a central point, namely in the central memory. After start of the system, the control units first identify themselves with the aid of their connecting elements. Following that, by means of the loading programs in the non-volatile memories of the control units, the programs are loaded from the central memory into the non-volatile memories of the control units, via indirect memory access, and are subsequently processed.

Since the programs run in the volatile memory (the working memory (RAM)), a faster program run is achieved because of the shorter access times. It is also of advantage that only a relatively smaller non-volatile memory is still necessary. This saves costs.

Because of the indirect access method of the control units to the central memory, the internal data bus structure of the main control device can be chosen independently of the data bus structure of the control units.

For the central memory, the use of a mobile storage medium, such as a CD-ROM or a memory chip is preferred. Because of the independence of the data bus structures this is not a problem. Then, for subsequent modifications, only the mobile storage medium still has to be exchanged. If the driver takes the mobile storage medium with him when he leaves his motor vehicle, the vehicle is safe from theft. It is of advantage if the non-volatile memory is a BOOT-EPROM. These storage modules are available in various types.

As communications bus, a serial communication bus such as a CAN, a TTP/C or an RS 232 is preferably used.

In one advantageous embodiment of the present invention, the connecting elements for connecting the control devices to the communications bus are plug devices. These simplify the exchange of the control units. This exchangeability is made more advantageous if the plug connection devices have contact or terminal pins, whose coding makes possible the identification of the control units. Then, the position recognition and the function recognition of the control unit take place via the pin coding of the plug connection device.

The number of coded pins determines the number of possible combinations. Two bits are required for coding the four control units of the EMB, e.g. 00 for left front, 01 for right front, 10 for rear left and 11 for rear right.

However, for safety reasons the redundancy is raised, and coding is done using more than two bits.

The method according to the present invention for starting a system for control/regulation of the operational sequences in a motor vehicle, having a number of control units for controlling/regulating, which each have a volatile memory and a non-volatile memory, and having a main control device having a central memory, includes the following method steps:

After switching on the system, the identification of the individual control units takes place. Next, the loading programs in the non-volatile memories of the control units are started. The programs are loaded from the central memory into the volatile memories of the control units via an indirect memory access to the central memory. During the operation of the motor vehicle, these programs control the control units and, thereby, the operating of the motor vehicle.

Since there is no direct access of the control units to the program memory, quite different bus systems and memory configurations can be used in the control units, which are completely independent of the central memory.

DETAILED DESCRIPTION

Figure 1A:
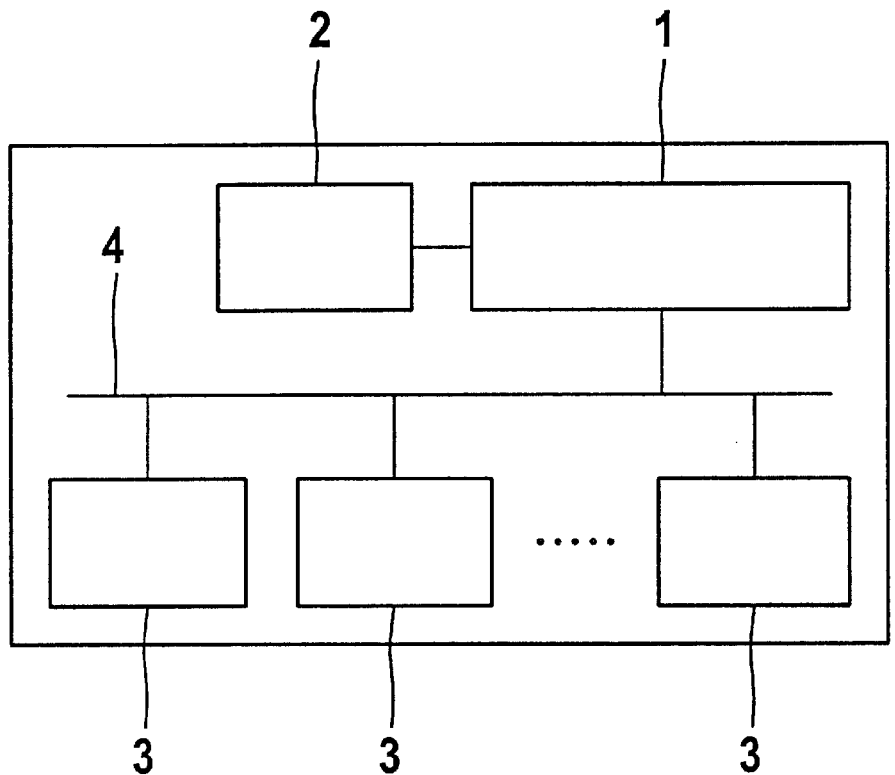
FIG. 1a shows a schematic, block diagram-like representation of a preferred specific embodiment of the system according to the present invention.

The system represented in FIG. 1a has a main control device 1, a central memory 2 connected to this, three control units 3 for controlling or regulating and a communications bus 4.

The communications bus 4 connects the three control units 3 to one another and to the main control device 1. Access of the control units 3 to the central memory 2 takes place indirectly via the main control device 1. The indirect memory access is characterized in that the main control device 1 has to initiate the memory access to the connected central memory 2. The appropriate memory content from the corresponding control unit 3 is read in via the bus interface of the communications bus 4 and processed. From there, directly or via the processor, the memory content is stored in the local volatile memory. In the case of indirect memory access, it is of advantage that no further memory bus is required, but that the communications system is used which is already present.

Figure 1B:
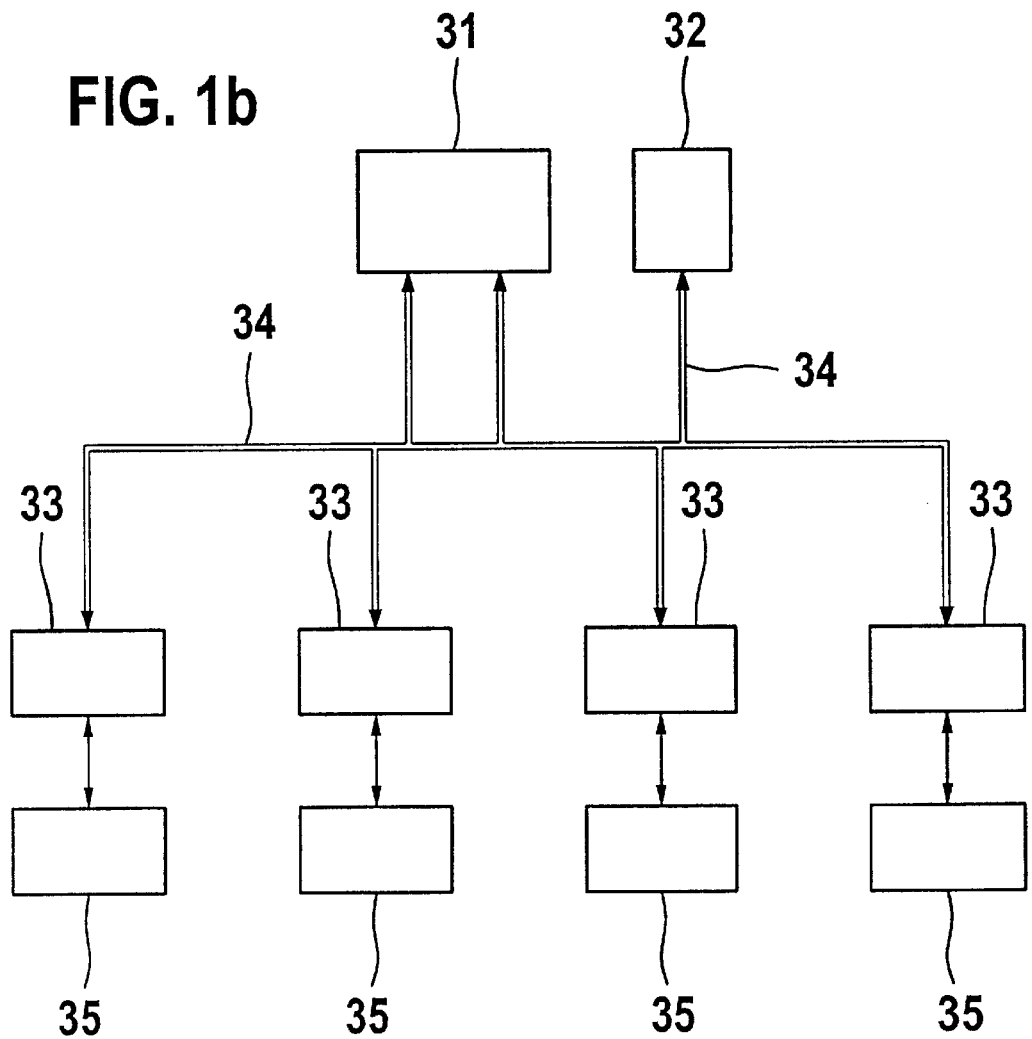
FIG. 1b shows a further concrete specific embodiment of the system according to the present invention.

FIG. 1b represents a concrete usage case. The system represented is used for regulating the electromechanical brake (EMB). The system includes a pedal module 31, a processing module 32, four wheel modules 33, a communications system 34 and four peripheral devices 35.

The wheel modules 33 are constructed identically and differ only in their assignment to the individual wheels, because the actuating variables can also be specifiable by individual wheel. It is a matter of individual wheel regulations, which, for example, have to reset the various braking force setpoint values during an ABS system intervention. In addition, when a sensor signal is sent, it has to be recognizable to which wheel the sensor is attached. The pedal module 31 and the processing module 32 are one of a kind and have individual programs valid for only that module. Programs such as ABS, ASR, ACC, etc., are provided for in the processing module 32.

The pedal module 31 makes possible the recording of a driver's intention, system monitoring, a release strategy and the read-out of the central program memory.

The wheel modules 33 regulate the braking force. Each wheel module 33 is connected to a peripheral device 35. The latter contains the sensor technology and the actuating technology. The wheel modules 33 record the signals of the sensors at each respective wheel and evaluate them. Then there is also a base monitoring of the actuating and sensor technologies.

The system is started by applying the supply voltage. At this point, each wheel module 33 runs through an initialization phase, during which, among other things, it determines its identity via a pin code. This code is transmitted via the serial interface to the pedal module 31, which thereby knows which (system) participant is at the bus. Now the pedal module 31, using any method, can load program codes into the wheel module 33 via the interface. Preferably, the available interface will be used, that means TTCP, TTCAN, etc. The data are received by the wheel module 33 and stored in a local RAM. After the loading process is finished, the program is ready in wheel module 33 for executing, and can assume its duties.

The pedal module 31 can now program the next wheel module 33. This goes on until all wheel modules 33 or control units of the entire system are programmed. Program code which is the same for all control units, as for example for the wheel modules 33, can be received in parallel. Individual programs are selectively received only by special control units which know their appropriate function via their identification. At this point, the method of programming is not more closely specified, since there are many specific embodiments of this.

The data bus structure of the main control device 1 in FIG. 1a is independent of the data bus structure of the three control units 3. In this case, for instance, the control units use a 16-bit data bus. This is, for example, realized by information technological connecting in parallel two 8-bit memories.

Figure 2:
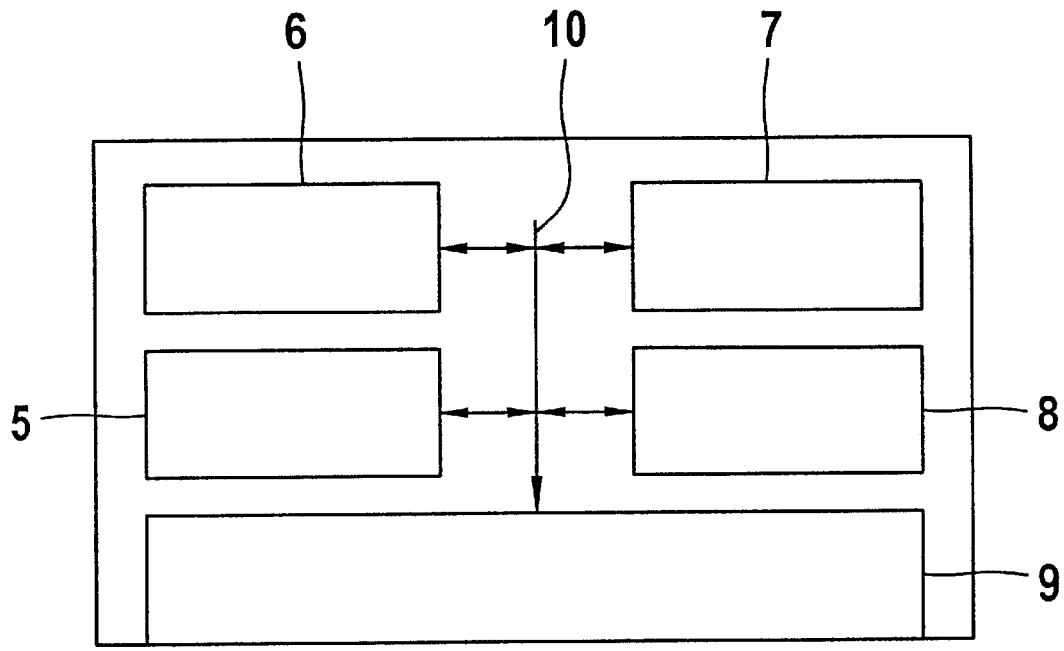
FIG. 2 shows a block diagram-like, schematic representation of a control unit usable according to the present invention for controlling or regulating the operational sequences of a motor vehicle.

FIG. 2 shows the construction of a control device for controlling or regulating the operational sequences of a motor vehicle. This has a CPU 5, a communications interface 6, a BOOT-EPROM 7 and a RAM structural element 8. Instead of the BOOT-EPROM 7, an EEPROM or a flash memory can also be used. The cited functional elements are connected to one another and to a peripheral hardware unit 9 via a data bus 10.

After starting the system, the identification of the individual control units takes place. At this point, each control unit runs through an initializing phase. In this phase it can determine, for instance, its identity via a PIN code. This code is transmitted via the serial interface to the pedal module 31, which thereby knows which (system) participant is at the bus. The identification can proceed in various ways. For example, the use of a DIP (dual in line) switch in or on a control unit is a possibility for identification. The identification can also be made by the programming via an interface (e.g. RS 232). A fixed programming can also be provided in the BOOT-EPROM 7. Even programming on a printed circuit board via fixed bridges can be considered, similar to plugs described elsewhere. But these methods have the disadvantage that they are costly (each garage needs to have a programming device), that they make the system inflexible, and that they are prone to errors, because each exchange of a control unit involves new programming, too. In the method described in FIG. 3 the coding is done permanently, independently of the control unit. That means that the control units can be exchanged at will, even amongst one another.

After the identification, the loading program runs in the BOOT-EPROM 7, and effects an indirect memory access via the communications interface 6 to the central memory 2. The indirect memory access is characterized in that the control device having the connected central memory has to initiate the memory accesses, that the corresponding memory content is processed via the bus interface of the communications system, and sent on, and is read in by the corresponding receivers (control units) via the bus interface of the communications system and processed, and from there—directly or via the processor—is stored in the local volatile memory. No upgraded memory bus is required for the transfer of data, but the communications system already present is used. This, however, requires a little more complex handling of memory accesses, since these are no longer made directly by the individual control units, but in coordinated fashion via the control device having the connected central memory. The control device having the connected central memory takes on the function of a gateway between the central memory and the control units connected via the communications bus.

The loaded program is stored in the RAM program module 8, and processed by the CPU 5. The peripheral hardware unit 9 is controlled via the data bus 10.

In the case of an EMB, for example, the program in the wheel module includes a control algorithm for adjusting a brake force, a monitoring program for the connected sensors, a plausibility monitoring of motor current, motor angle and preset braking force, as well as a communications interface for receiving setpoint values and for transmitting actual sensor signals and actual values.

Figure 3:
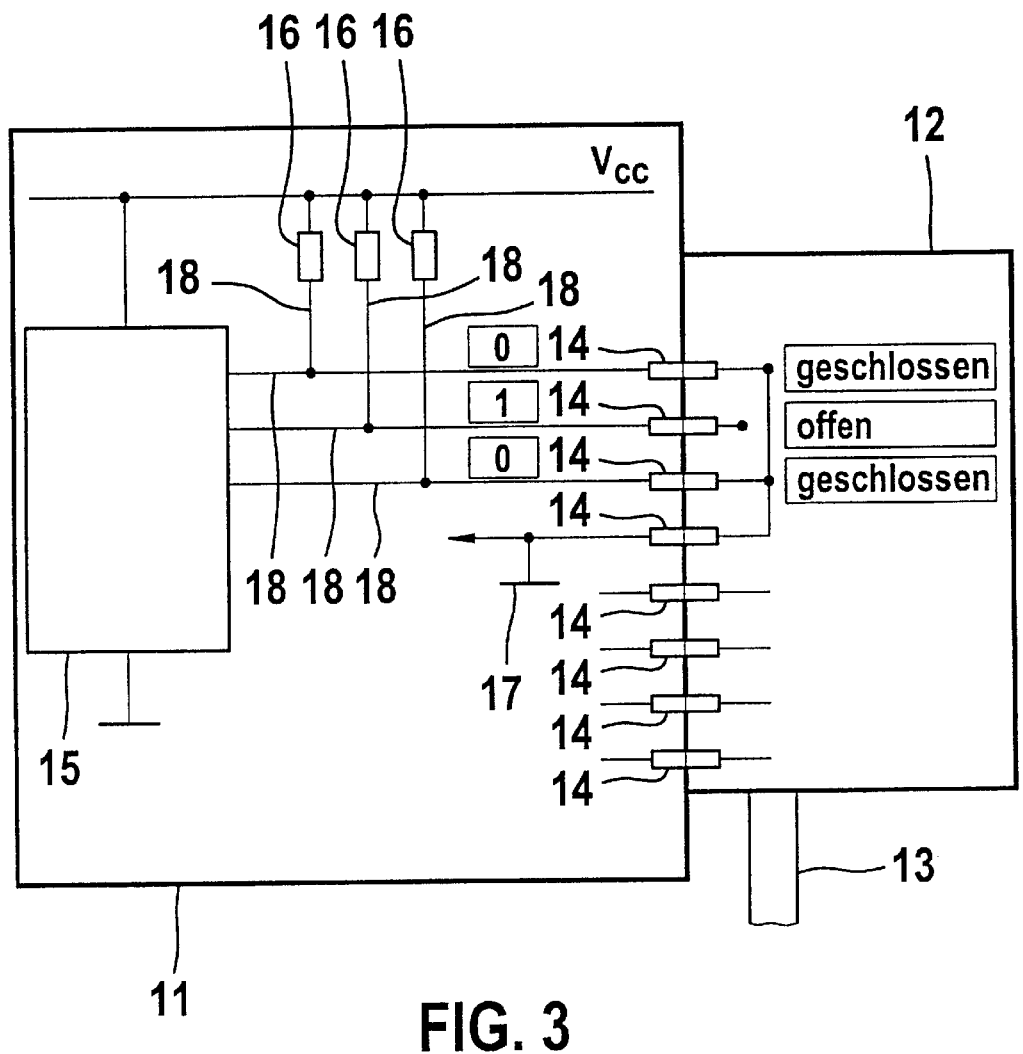
FIG. 3 shows a diagram representing how a control unit identifies itself with the aid of a connecting element.

In FIG. 3 it is made clear how a control unit identifies itself with the aid of a connecting element. For example, further identification possibilities are the use of a DIP switch, programming via an interface, permanent programming in the BOOT-EPROM and programming on a printed circuit board via fixed bridges. Compared to these methods, the method introduced here is more favorable, more felixible and less prone to errors. Since the coding is permanent, the control units can be exchanged at will, even among one another.

The identification is necessary because the control unit, when loading software from the central memory 2 (FIG. 1), also has to load individual programs. Individual programs are used, for instance, for regulating the ABS system, for temperature control, for engine control, or rather that of the engine management system, for the airbags, etc.

FIG. 3 shows a control device 11 which is connected to the cable harness 13 of a motor vehicle via a plug device 12. The control device 11 is coupled to the plug device by eight contact pins 14. Also seen in the control device 11 are a CPU 15, three resistors 16, a ground connection 17 and code lines 18.

The upper three contact pins 14 are used for coding. The fourth contact pin 14 is connected to the ground terminal 17. The code lines 18 run via resistors 16 from the supply voltage V, to the CPU 15, and to the plug device 12. In the plug device 12, the contact pins 14 provided for coding are bridged to ground or left open. In this case, the first and the third contact pins 14 are bridged to ground. The second contact pin 14 is left open. Depending on the connection of the contact pins 14, the CPU reads in a code which identifies the control device 11. Here, the code reads 0 1 0.

As a matter of principle, any desired code can be used (ASCII, BCD, Gray, unit-distance code, multistep codes, error-correctable codes, etc.). It is best to add additional redundancies to the code to heighten the security. That way, possible errors can already be recognized in the code word. Such codes are called self-correcting codes (1 F code is a code in which, for example, an error in the code word can be recognized and corrected).

When the system is started, the code is read first, so that the control device 11 can identify itself.

After that, the control device 11 can receive data from the central memory 2 (FIG. 1). The program code is loaded from the central memory 2 into the control device 11 via the interface, using any method desired. The control device 11 receives the data and stores it in the RAM. After the loading process, the program is ready for application. The control device 11 can assume its purpose.

Figure 4:
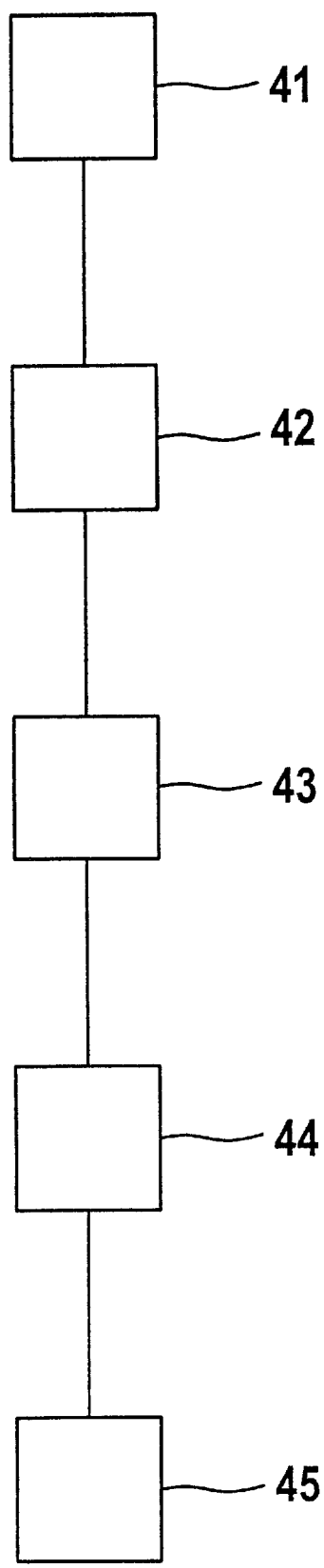
FIG. 4 shows a flow diagram to explain a preferred specific embodiment of the method according to the present invention.

In a flow diagram, FIG. 4 makes clear the sequence of the method according to the present invention.

In step 41, the system is switched on. This occurs by applying the supply voltage. In step 42 there follows the identification of the control units. For that purpose, after the start of the system, each control unit runs through an initializing phase, in which it determines its identity, for instance, by PIN codes. This code is transmitted via the serial interface to the main control device, which thereby knows which (system) participant is at the bus.

The beginning of the loading programs into the non-volatile memories of the control units takes place at step 43.

At step 44 the indirect memory access of the control units to the central memory begins. The main control device can load program codes into the control units using any method desired. These data are received by the control units in step 45 and stored in the appropriate volatile memories. At the end of the loading process, the program is ready for executing in the control unit. In this manner, all the control units are programmed one after another. A program code which is the same for all control units can be received in parallel. Individual programs are purposely received only by the appropriate control units.

What is claimed is:

1. A system for controlling/regulating operating sequences of a motor vehicle, comprising:

controlling/regulating control units, each of the control units having a volatile memory and a non-volatile memory, the non-volatile memories containing a loading program;

a main control device having a central memory, the central memory storing programs of the control units, providing indirect access of the control units to the central memory; and connecting elements for providing an identification of an appropriate at least one of the control units, each of the connecting elements coupling a respective one of the control units to a communications system.

2. The system according to claim 1, wherein the central memory includes a mobile memory medium.

3. The system according to claim 1, wherein at least one of the non-volatile memories includes a BOOT-EPROM.

4. The system according to claim 1, wherein the communications system includes a serial communications bus.

5. The system according to claim 1, wherein at least one of the connecting elements includes a plug connector device.

6. The system according to claim 5, wherein the plug connector device has contact pins whose coding provides an identification of a corresponding one of the control units.

7. A method for starting a system for controlling/regulating operational sequences in a motor vehicle having controlling/regulating control units, each of the control units having a volatile memory and a non-volatile memory containing a loading program, the motor vehicle further having a main control device having a central memory, the method comprising:

switching on the system;

identifying the control units;

starting the loading program in the non-volatile memories of the control units;

providing an indirect access of the control units to the central memory; and loading programs into a corresponding volatile memory of the control units.

* * * * *